(12) United States Patent
Lin et al.

(10) Patent No.: US 7,597,253 B2
(45) Date of Patent: Oct. 6, 2009

(54) ELECTRONIC SEAL

(75) Inventors: Lien-Feng Lin, No. 30-29, Sec. 1, Wanhe Rd., Nantun District, Taichung City 408 (TW); Hsiu-Feng Lee, No. 30-29, Sec. 1, Wanhe Rd., Nantun District, Taichung City 408 (TW); Hank Her, Changhua (TW)

(73) Assignees: Lien-Feng Lin, Taichung (TW); Hsiu-Feng Lee, Taichung (TW)

( * ) Notice: Subject to any disclaimer, the term of this patent is extended or adjusted under 35 U.S.C. 154(b) by 690 days.

(21) Appl. No.: 11/072,446

(22) Filed: Mar. 7, 2005

(65) Prior Publication Data

US 2005/0263602 A1 Dec. 1, 2005

(30) Foreign Application Priority Data

May 31, 2004 (TW) .............................. 93208575 U
Aug. 17, 2004 (TW) .............................. 93213088 U

(51) Int. Cl.
*G06K 5/00* (2006.01)
*G08B 13/14* (2006.01)

(52) U.S. Cl. .................................. 235/382; 340/572.8

(58) Field of Classification Search ................. 235/492; 340/551, 572.8
See application file for complete search history.

(56) References Cited

U.S. PATENT DOCUMENTS

| 6,265,973 | B1 * | 7/2001 | Brammall et al. ........ 340/568.1 |
| 6,747,558 | B1 * | 6/2004 | Thorne et al. ............... 340/551 |
| 6,778,083 | B2 | 8/2004 | Auerbach et al. |
| 7,044,512 | B1 * | 5/2006 | Moreno .................. 292/259 R |

FOREIGN PATENT DOCUMENTS

| CN | 1293732 | 5/2001 |
| CN | 2531066 | 1/2003 |
| CN | 2575613 | 9/2003 |
| FR | 2816434 | 5/2002 |
| WO | WO00/34605 | 6/2000 |

* cited by examiner

*Primary Examiner*—Jamara A Franklin
(74) *Attorney, Agent, or Firm*—Rosenberg, Klein & Lee

(57) ABSTRACT

An electronic seal includes a main body, an insertion bolt, and an identification circuit. Thus, the electronic seal has a determined identification code so that the identification host can rapidly identify the article (or storage space) sealed by the electronic seal, and the sealed article is identified and managed easily and conveniently by provision of the electronic seal, thereby saving the manual work.

14 Claims, 21 Drawing Sheets

ELECTRONIC SEAL

BACKGROUND OF THE INVENTION

1. Field of the Invention

The present invention relates to an electronic seal, and more particularly to an electronic seal that uses a RFID (Radio Frequency Identification) technology to seal a storage space.

2. Description of the Related Art

A mechanical seal is used to seal a storage space, such as a cargo container placed in the customs temporarily. The conventional mechanical seal is like a lock and comprises a main body, and an insertion bolt. Thus, when the insertion bolt is inserted into the main body, the insertion bolt is locked in and cannot be detached from the main body. For example, after the mechanical seal is locked on the door of the cargo container, it is necessary to cut the insertion bolt so as to open the door of the cargo container. In addition, the mechanical seal has an identification number to facilitate identification and management of the cargo container. However, the identification number of each of the cargo containers is registered and managed in a manual manner, thereby wasting time and manual work. In addition, the identification number can be seen from the outside of the cargo container, so that the identification number can be reproduced, thereby decreasing the safety of the mechanical seal.

SUMMARY OF THE INVENTION

The present invention is to mitigate and/or obviate the disadvantage of the conventional mechanical seal.

The primary objective of the present invention is to provide an electronic seal that integrates a RFID technology and a mechanical seal so as to facilitate management of the sealed article and to inspect if the sealed article has been intruded rapidly.

Another objective of the present invention is to provide an electronic seal, wherein the electronic seal has a determined identification code so that the identification host can rapidly identify the article sealed by the electronic seal, and the sealed article is identified and managed easily and conveniently by provision of the electronic seal, thereby saving the manual work.

A further objective of the present invention is to provide an electronic seal, wherein the electronic seal has a determined identification code so that the identification host can detect if the electronic seal has been broken or substituted and if the sealed article has been intruded intentionally.

Further benefits and advantages of the present invention will become apparent after a careful reading of the detailed description with appropriate reference to the accompanying drawings.

DETAILED DESCRIPTION OF THE INVENTION

Figure 1:
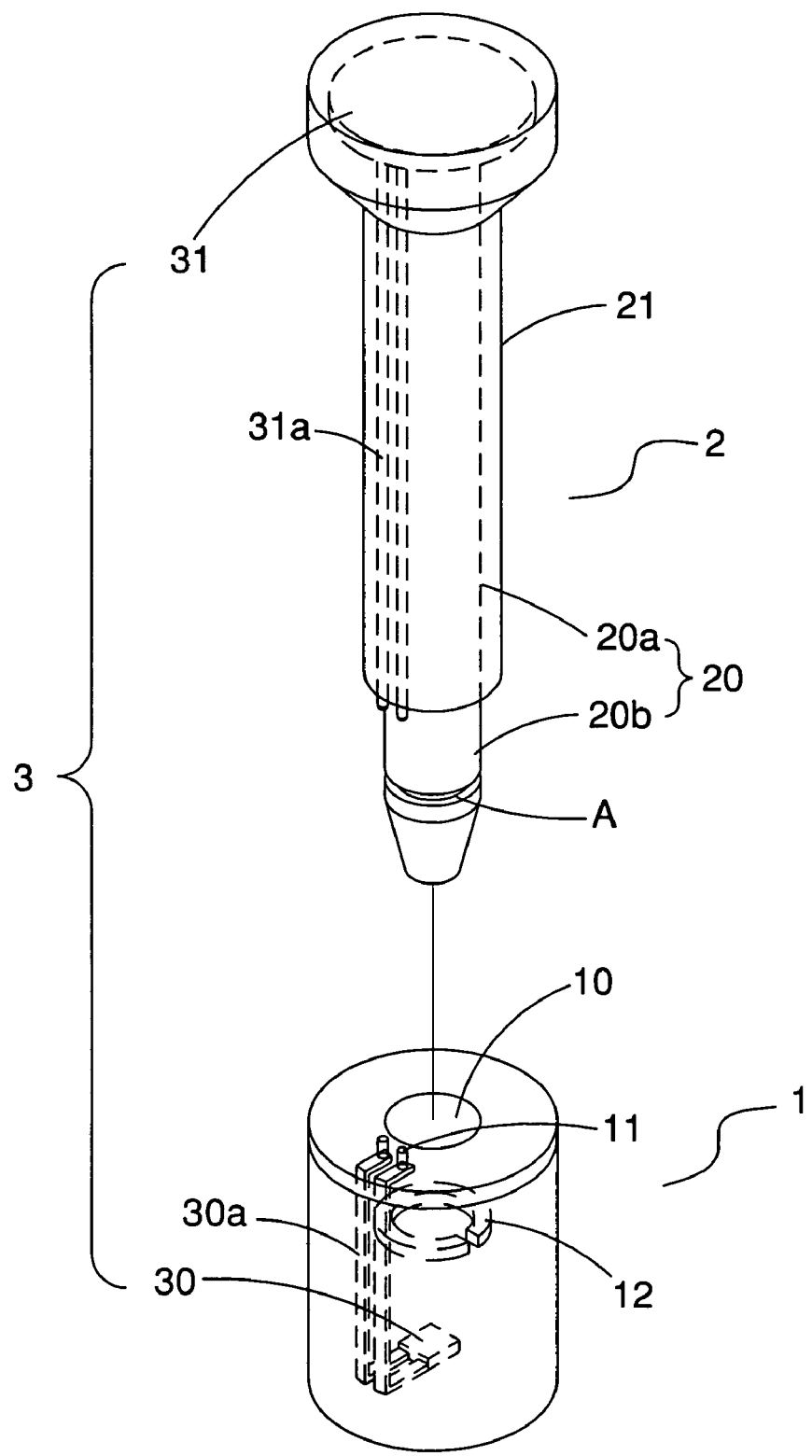
FIG. 1 is an exploded perspective view of an electronic seal in accordance with the first preferred embodiment of the present invention.
Figure 2:
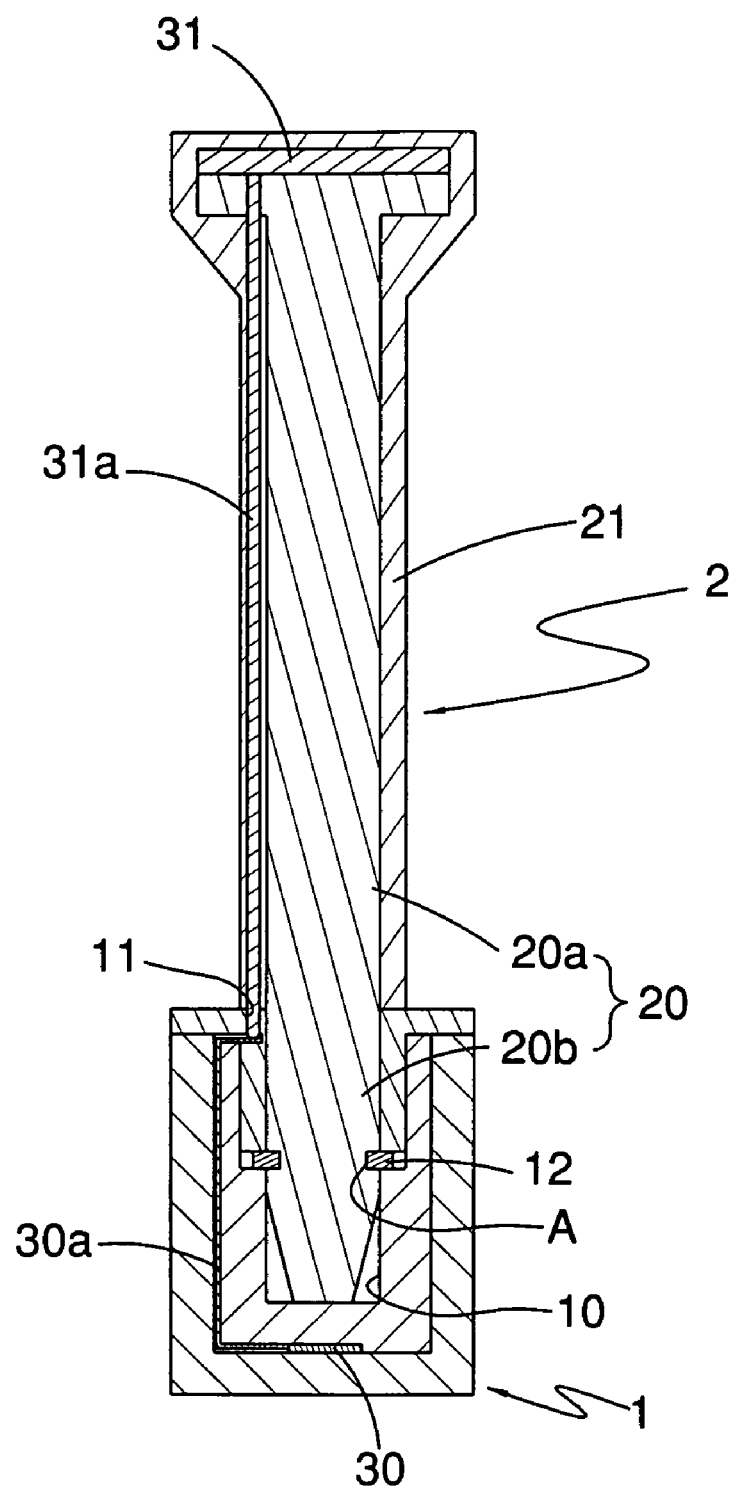
FIG. 2 is a plan cross-sectional assembly view of the electronic seal as shown in FIG. 1.

Referring to the drawings and initially to FIGS. 1 and 2, an electronic seal in accordance with the preferred embodiment of the present invention comprises a first fastening body, a second fastening body engageable with said first fastening body, and an identification circuit 3. In this embodiment, said first fastening body, is a main body 1 while said second fastening body is an insertion bolt 2. However, in an alternative embodiment, said main body 1 may be said second fastening body while said insertion bolt 2 may be said first fastening body. In this embodiment, the main body 1 has a top face formed with an opening 10 and two insertion holes 11 and has an inside provided with a C-shaped snap ring 12 that can be expanded elastically. The insertion bolt 2 includes a bolt rod 20 made of metal and a bolt shell 21 made of plastic or rubber. The bolt rod 20 has a base section 20a covered by the bolt shell 21 and a snapping section 20b having a peripheral wall formed with an annular groove "A". The identification circuit 3 has a first portion provided with an identification chip 30 mounted in the main body 1 and a second portion provided with an antenna 31 mounted in the insertion bolt 2. The identification chip 30 of the identification circuit 3 has two conducting legs 30a each extended to a bottom of the respective insertion hole 11 of the main body 1, and the antenna 31 of the identification circuit 3 has two antenna legs 31a each extended outward from the bolt shell 21 of the insertion bolt 2.

As shown in FIG. 2, the snapping section 20b of the bolt rod 20 of the insertion bolt 2 is inserted into the main body 1, and the snap ring 12 is snapped into the annular groove "A" of the snapping section 20b, so that the insertion bolt 2 cannot be removed from the main body 1. At the same time, each of the two antenna legs 31a of the antenna 31 is inserted into the respective insertion hole 11 of the main body 1 and in contact with the respective conducting leg 30a of the identification chip 30, so that the identification chip 30 is electrically connected to the antenna 31 to drive and operate the identification circuit 3.

Figure 3:
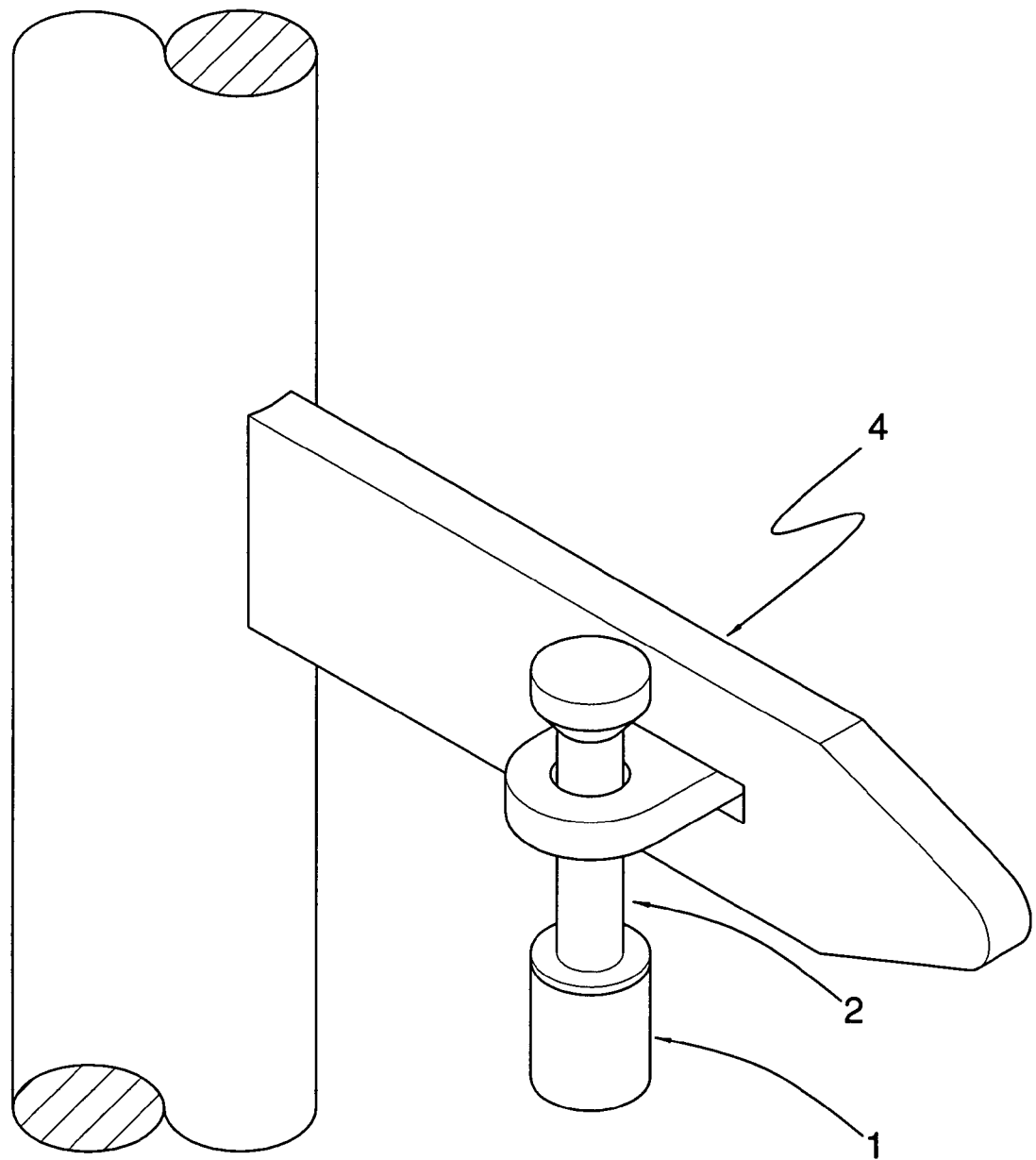
FIG. 3 is a schematic operational view of the electronic seal as shown in FIG. 1 in use.

As shown in FIG. 3, the electronic seal is mounted on a door latch 4 of a cargo container. At this time, the insertion bolt 2 is extended through the door latch 4 and then snapped into the main body 1.

Figure 4:
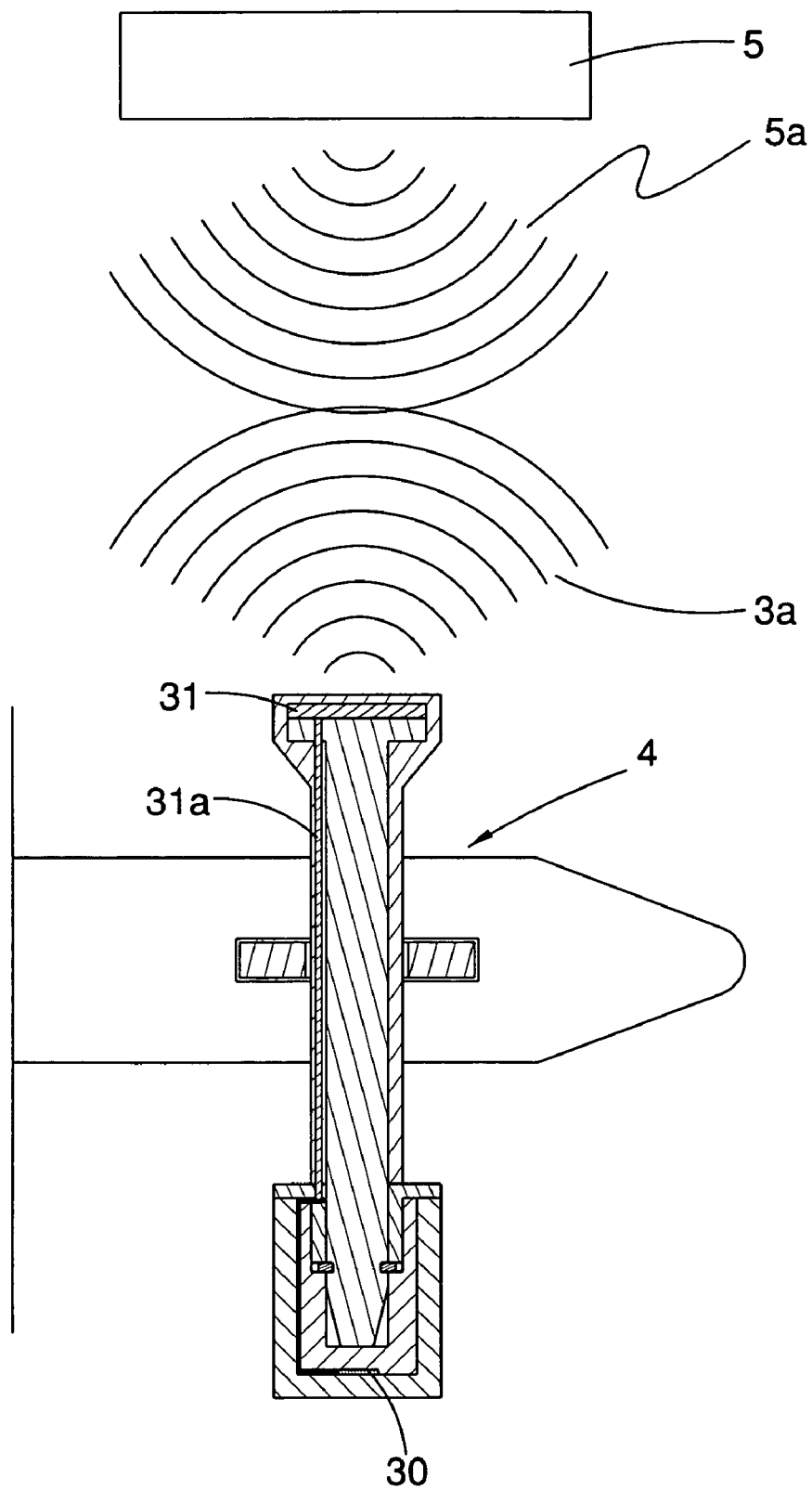
FIG. 4 is a schematic operational view of the electronic seal as shown in FIG. 1 in use.

As shown in FIG. 4, when an identification host 5 approaches the door latch 4, the antenna 31 receives a magnetic wave 5a transmitted from the identification host 5. Then, the identification chip 30 transfers the energy of the magnetic wave 5a into a voltage which modulates the identification code contained in the identification chip 30 into an identification magnetic wave 3a which is transmitted from the antenna 31. Then, the identification host 5 receives and demodulates the identification magnetic wave 3a to obtain the identification code so as to identify the cargo container according to the identification code, so that the cargo container is identified and managed easily and conveniently, thereby saving the manual work.

If the insertion bolt 2 is cut or broken, the two antenna legs 31a of the antenna 31 are also cut or broken to interrupt the electrical connection of the identification chip 30 with the antenna 31 to stop operation of the identification circuit 3, so that the identification host 5 cannot read the identification code, which indicates the electronic seal has been broken and the cargo container has been intruded. In addition, if the main body 1 or the insertion bolt 2 is substituted, the identification host 5 cannot read the identification code of the identification chip 30. Thus, the identification host 5 can rapidly detects if the electronic seal is broken or substituted, thereby providing a safety effect.

Figure 5:
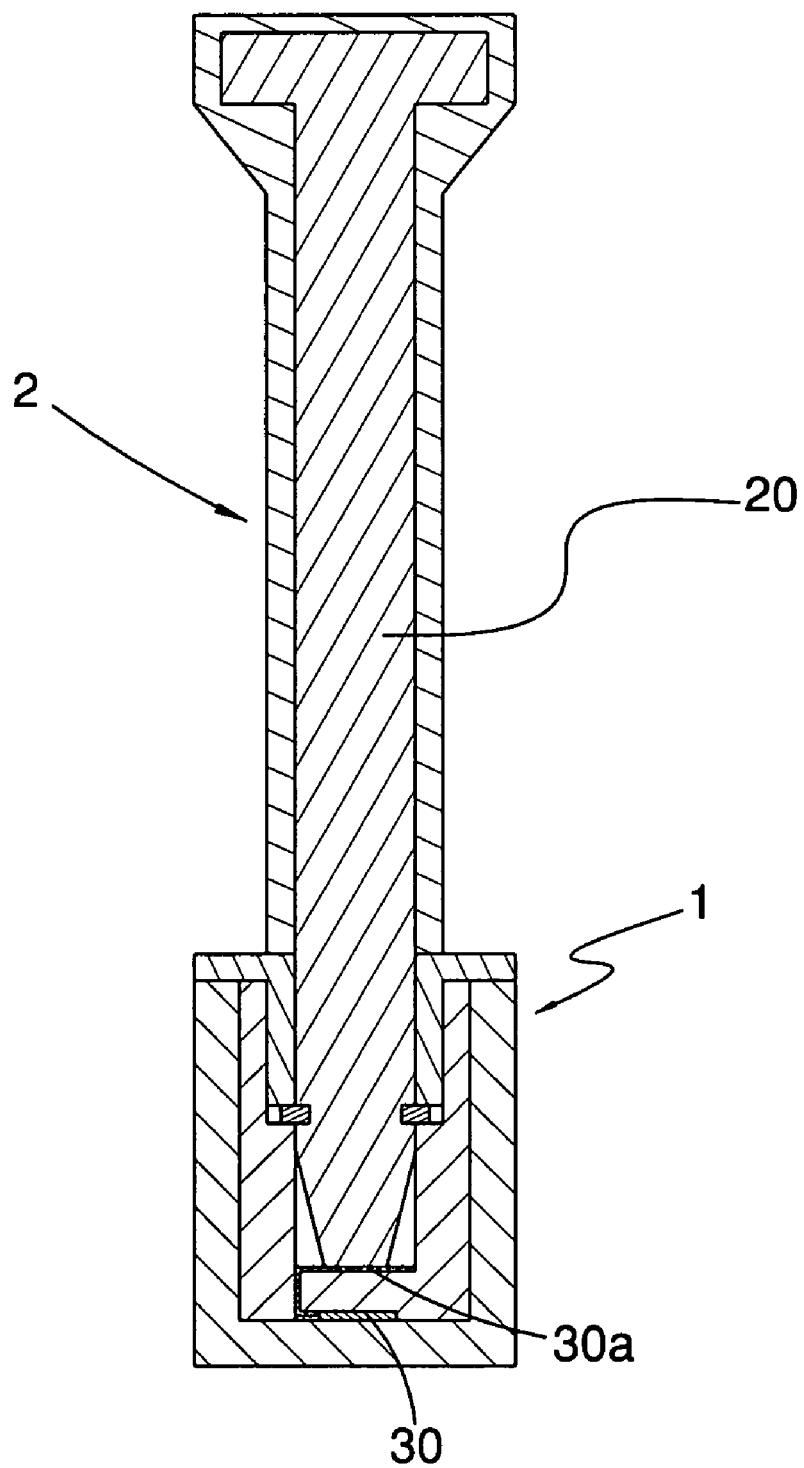
FIG. 5 is a plan cross-sectional assembly view of an electronic seal in accordance with the second preferred embodiment of the present invention.

Referring to FIG. 5, the bolt rod 20 of the insertion bolt 2 is made of a conductive metal to function as an antenna, and the conducting legs 30a of the identification chip 30 are extended to a position facing the bolt rod 20 of the insertion bolt 2. Thus, when the insertion bolt 2 is inserted into the main body 1, the bolt rod 20 of the insertion bolt 2 is in contact with the conducting legs 30a of the identification chip 30, so that the identification chip 30 is electrically connected to the bolt rod 20 of the insertion bolt 2 to drive and operate the identification circuit 3.

Figure 6:
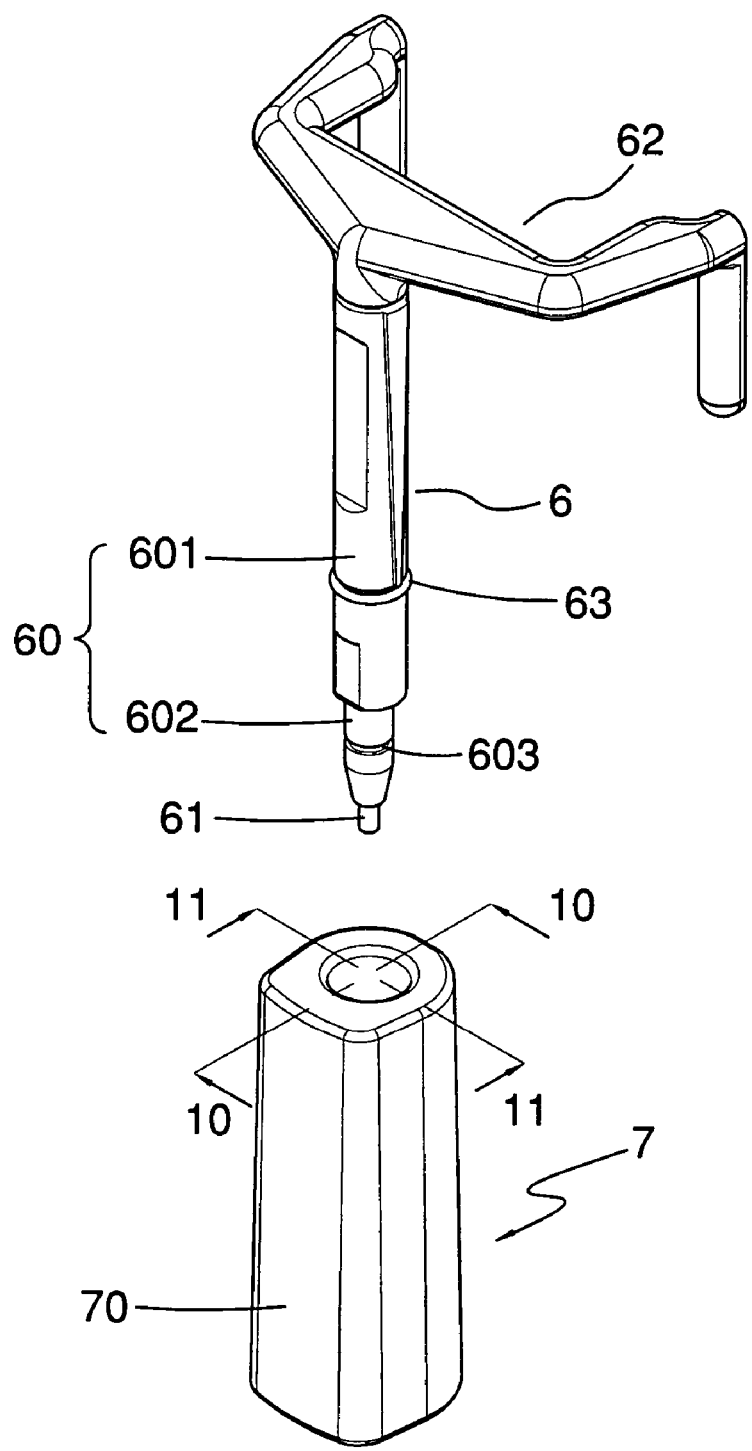
FIG. 6 is an exploded perspective view of an electronic seal in accordance with the third preferred embodiment of the present invention.
Figure 7:
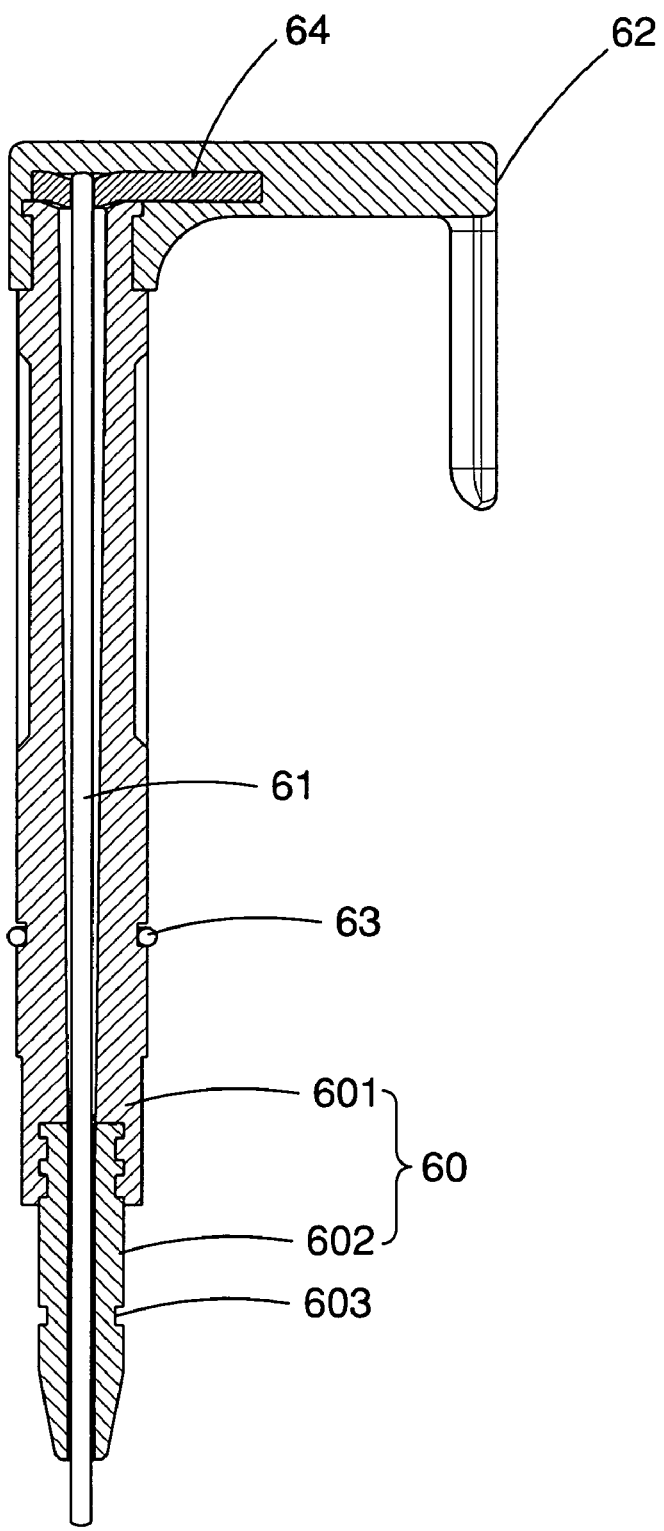
FIG. 7 is a plan cross-sectional assembly view of the electronic seal as shown in FIG. 6.

Referring to FIGS. 6 and 7, an electronic seal in accordance with another preferred embodiment of the present invention comprises an insertion bolt 6, and a main body 7. The insertion bolt 6 includes a bolt shell 60, a bolt rod 61, a hanging hook 62, and a waterproof ring 63. The bolt shell 60 has a base section 601 made of thermoplastic material, such as plastic or rubber, and a snapping section 602 made of metal connected to a bottom end of the base section 601 and having a peripheral wall formed with an annular groove 603. In addition, the snapping section 602 has a tapered end directed toward the main body 7 to facilitate insertion of the snapping section 602 into the main body 7. The bolt rod 61 is made of a conductive metal to function as an antenna. The bolt rod 61 is mounted in an inside of the bolt shell 60. The hanging hook 62 is extended from a top end of the base section 601 of the bolt shell 60. The waterproof ring 63 is mounted on the base section 601 of the bolt shell 60.

As shown in FIG. 7, the bolt rod 61 is slidably mounted in the bolt shell 60 and has a bottom end extended from the snapping section 602 of the bolt shell 60. The insertion bolt 6 further includes a protective piece 64 made of hard material connected to a top end of the bolt rod 61 and covered by the bolt shell 60.

Figure 8:
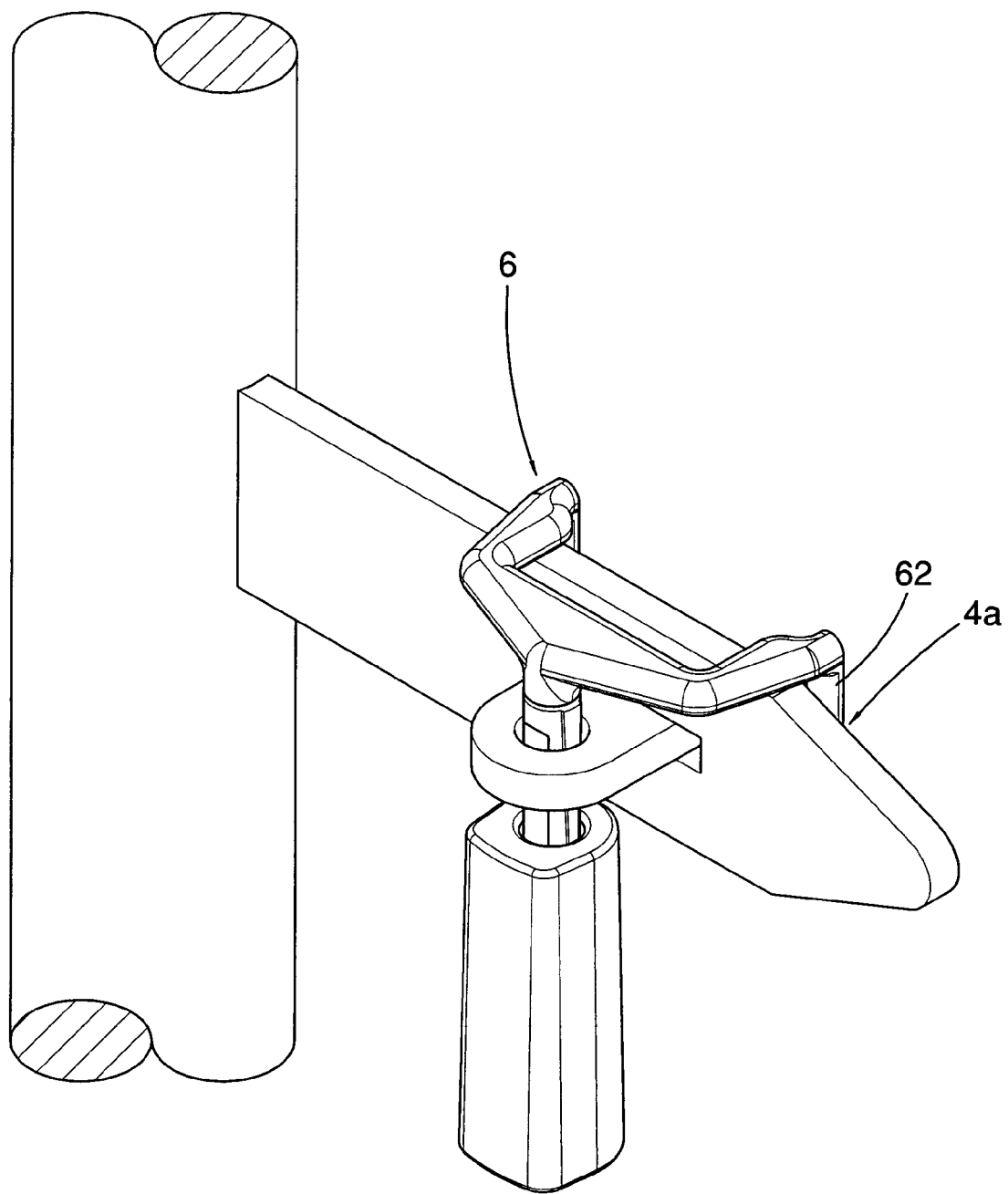
FIG. 8 is a schematic operational view of the electronic seal as shown in FIG. 6 in use.

As shown in FIG. 8, the electronic seal is mounted on a door latch 4a of a cargo container. At this time, the electronic seal is mounted on the door latch 4a rigidly and stably by the hanging hook 62.

Figure 9:
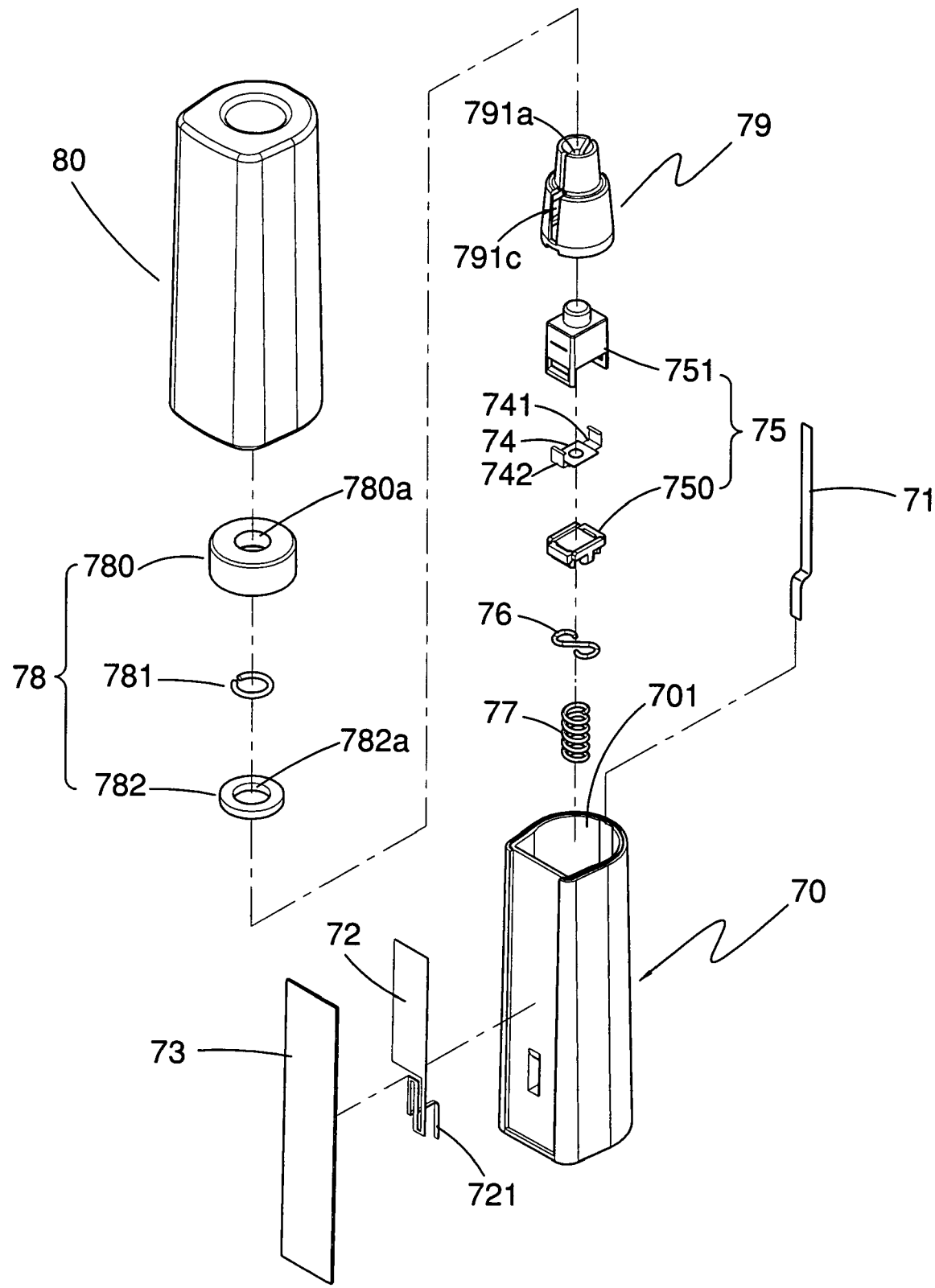
FIG. 9 is an exploded perspective view of a main body of the electronic seal as shown in FIG. 6.
Figures 10, 10A, 11:
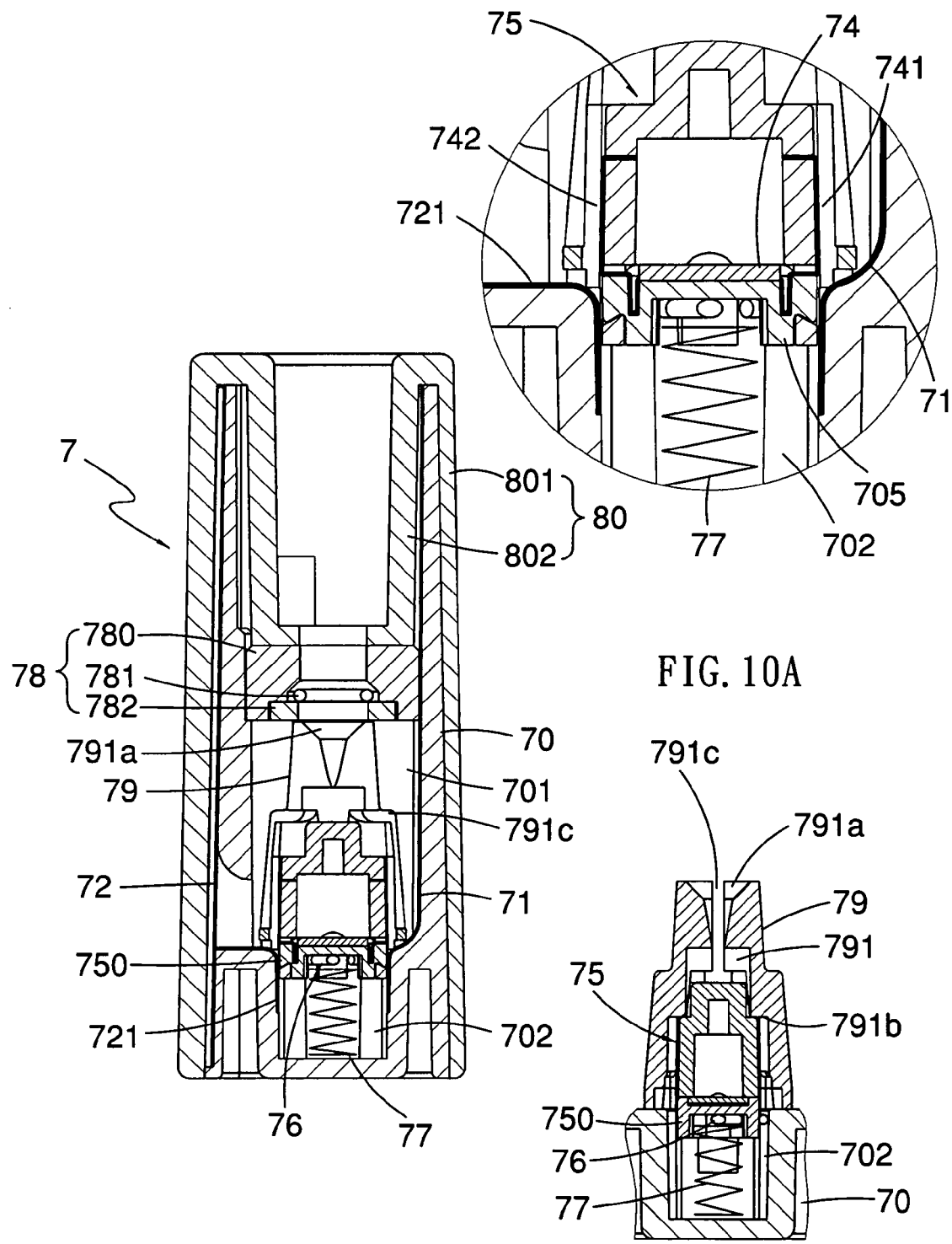
FIG. 10 is a plan cross-sectional view of the main body of the electronic seal taken along line 10-10 as shown in FIG. 6.
FIG. 10A is a locally enlarged view of the main body of the electronic seal as shown in FIG. 10.
FIG. 11 is a plan cross-sectional view of the main body of the electronic seal taken along line 11-11 as shown in FIG. 6.

Referring to FIGS. 9-11, the main body 7 includes a receiving seat 70, a conducting plate 71 mounted in the receiving seat 70, a plate antenna 72 mounted on an outside of the receiving seat 70 and provided with an antenna leg 721, an indication plate 73 mounted on the outside of the receiving seat 70, a slide seat 75 slidably mounted in the receiving seat 70 and has a base 750 and a cover 751 secured on the base 750, an identification chip 74 secured on the base 750 and provided with a first conducting leg 741 and a second conducting leg 742, a compression spring 77 mounted in the receiving seat 70 and biased between the slide seat 75 and the receiving seat 70, a substantially S-shaped elastic catch 76 mounted between the slide seat 75 and the compression spring 77, an expansion seat 79 mounted in the receiving seat 70, a snapping member 78 mounted in the receiving seat 70, and a transparent housing 80 mounted on the receiving seat 70. The snapping member 78 includes a fixing seat 780 having an inside formed with a passage 780a, a snap ring 781 mounted in the passage 780a, and a washer 782 having an inside formed with a hole 782a.

As shown in FIGS. 9 and 10, the receiving seat 70 has an inside formed with a first chamber 701 having an opening and a second chamber 702 connected to the first chamber 701 and having a bottom face. The transparent housing 80 has an outer shell 801 covering the outside of the receiving seat 70 and pressing the indication plate 73 and the plate antenna 72 and an inner shell 802 extended from the opening of the first chamber 701 into the receiving seat 70 to partially cover the first chamber 701 and press the fixing seat 780 which presses the washer 782 which presses the expansion seat 79.

As shown in FIGS. 9-11, the expansion seat 79 has an inside formed with a third chamber 791 having an inlet 791a and a stop 791b and has a peripheral wall formed with at least one slit 791c extended longitudinally from the inlet 791a to divide the expansion seat 79 into two parts. The stop 791b of the expansion seat 79 presses the slide seat 75 so that the slide seat 75 is located at a first position where the base 750 of the slide seat 75 is largely received in the second chamber 702 of the receiving seat 70 to press the elastic catch 76 and to press the compression spring 77 at the first time so that the compression spring 77 stores a first restoring force.

As shown in FIG. 10, the conducting plate 71 is partially fixed on the wall of the second chamber 702 of the receiving seat 70 and partially in contact with an outer wall of the fixing seat 780 of the snapping member 78, and the antenna leg 721 of the plate antenna 72 is extended into the receiving seat 70 and rested on the wall of the second chamber 702 of the receiving seat 70.

As shown in FIG. 10A, when the slide seat 75 is located at the first position, the first conducting leg 741 and the second conducting leg 742 of the identification chip 74 do not enter the second chamber 702 of the receiving seat 70. Thus, when the slide seat 75 is located at the first position, the identification chip 74 is not electrically connected to the conducting plate 71 and the plate antenna 72, so that the identification chip 74 cannot receive the magnetic wave 5a (see FIG. 4) transmitted from the identification host 5 and cannot transmit the identification magnetic wave 3a.

Referring to FIGS. 12-15, when the insertion bolt 6 is inserted into the main body 7, the snapping section 602 of the bolt shell 60 of the insertion bolt 6 is inserted into and positioned in the receiving seat 70 of the main body 7, and the snap ring 781 of the snapping member 78 is snapped into the annular groove 603 of the snapping section 602. At the same time, the bottom end of the bolt rod 61 pushes the slide seat 75 to move downward so that the slide seat 75 is located at a second position where the base 750 of the slide seat 75 presses the elastic catch 76 to press the compression spring 77 at the second time so that the compression spring 77 stores a second restoring force.

Figures 12, 12A:
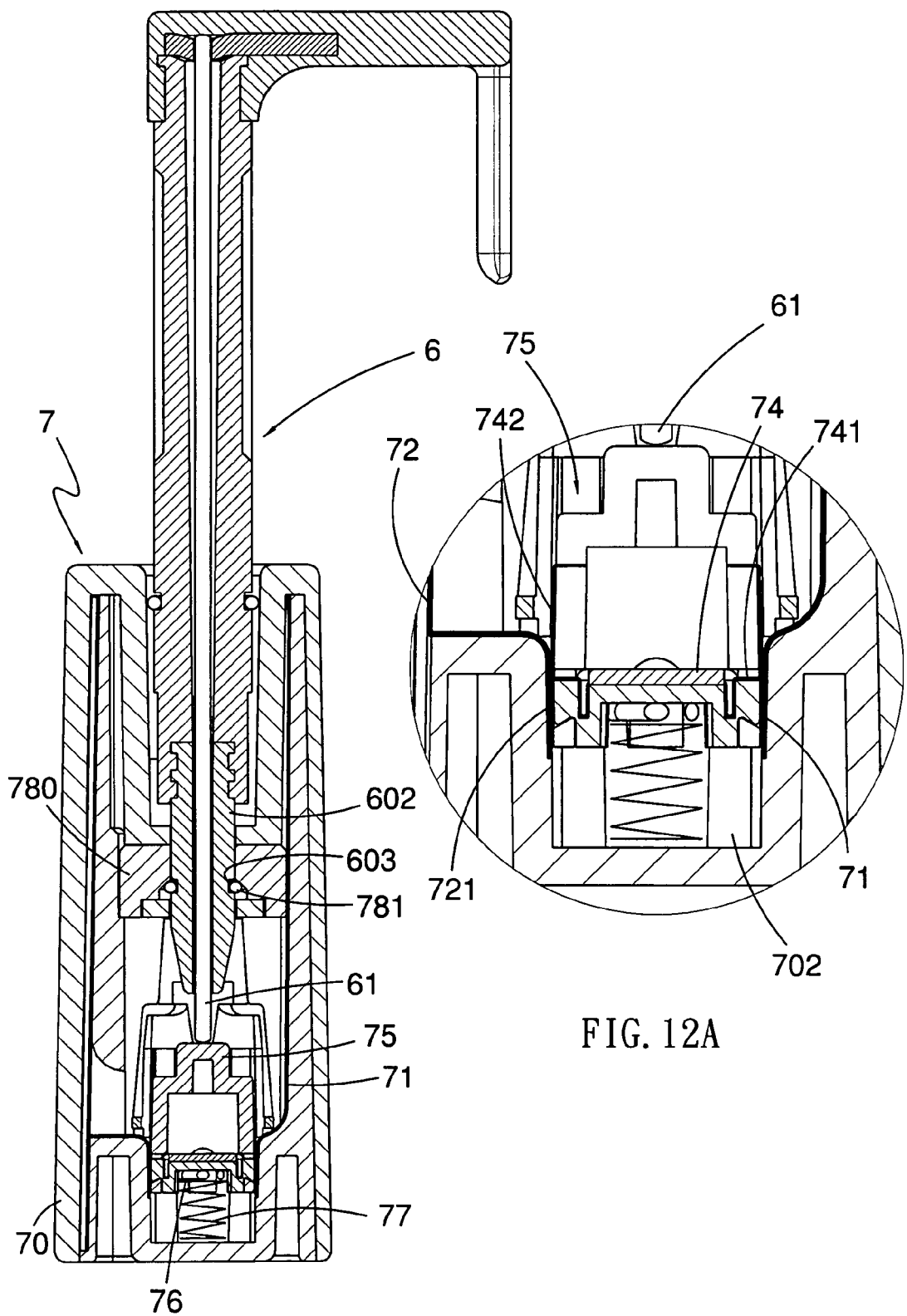
FIG. 12 is a plan cross-sectional assembly view of the electronic seal as shown in FIG. 6.
FIG. 12A is a locally enlarged view of the main body of the electronic seal as shown in FIG. 12.

As shown in FIGS. 12 and 12A, when the slide seat 75 is located at the second position, the bottom end of the bolt rod 61 pushes the slide seat 75 to move the identification chip 74 so that the first conducting leg 741 and the second conducting leg 742 of the identification chip 74 are moved into the second chamber 702 of the receiving seat 70 to contact the conducting plate 71 and the antenna leg 721 of the plate antenna 72. At this time, the fixing seat 780, the snap ring 781 and the snapping section 602 are made of conductive metal, and the fixing seat 780 contacts the conducting plate 71, so that when the slide seat 75 is located at the second position, the identification chip 74 is electrically connected to the bolt rod 61 through the conducting plate 71 and electrically connected to the plate antenna 72 through the antenna leg 721 of the plate antenna 72. At this time, the bolt rod 61 functions as an antenna. Thus, the identification chip 74 can receive the magnetic wave 5a (see FIG. 4) transmitted from the identification host 5 and transmit the identification magnetic wave 3a through the bolt rod 61 and the plate antenna 72.

Figure 13:
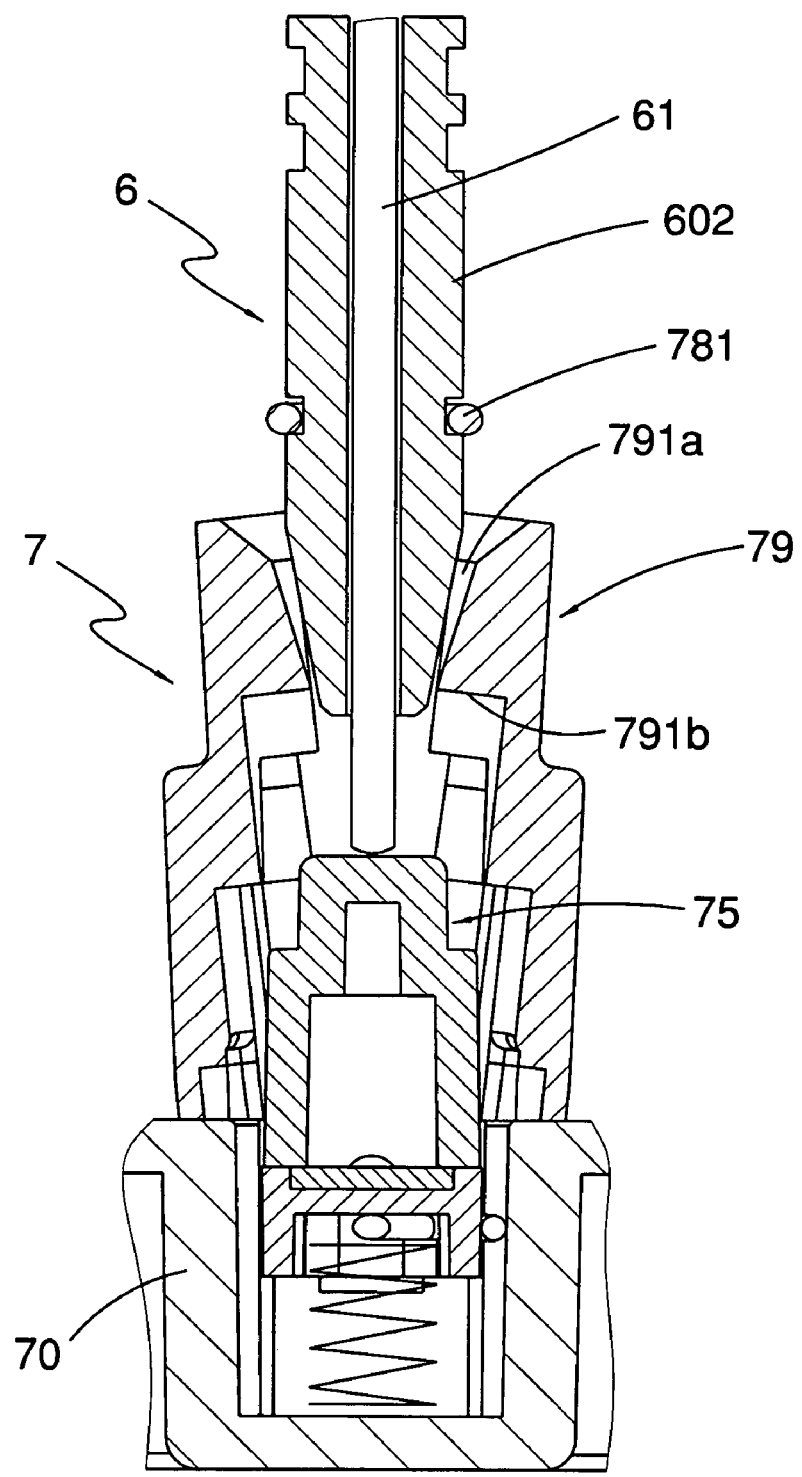
FIG. 13 is a locally enlarged operational view of the main body of the electronic seal as shown in FIG. 12.

As shown in FIG. 13, when the snapping section 602 of the bolt shell 60 of the insertion bolt 6 is inserted into and positioned in the receiving seat 70 of the main body 7, the snapping section 602 is inserted through the inlet 791a into the expansion seat 79. At this time, the snapping section 602 has an outer diameter greater than an inner diameter of the inlet 791a, so that the expansion seat 79 is expanded trough the slit 791c to expand the stop 791b, thereby detaching the slide seat 75 from the stop 791b. At this time, the snap ring 781 of the snapping member 78 is snapped into the annular groove 603 of the snapping section 602 to fix the snapping section 602 on the snapping member 78, so that the insertion bolt 6 cannot be detached from the receiving seat 70 of the main body 7. At the same time, the slide seat 75 is located at the second position by the bolt rod 61.

Figures 14, 14A:
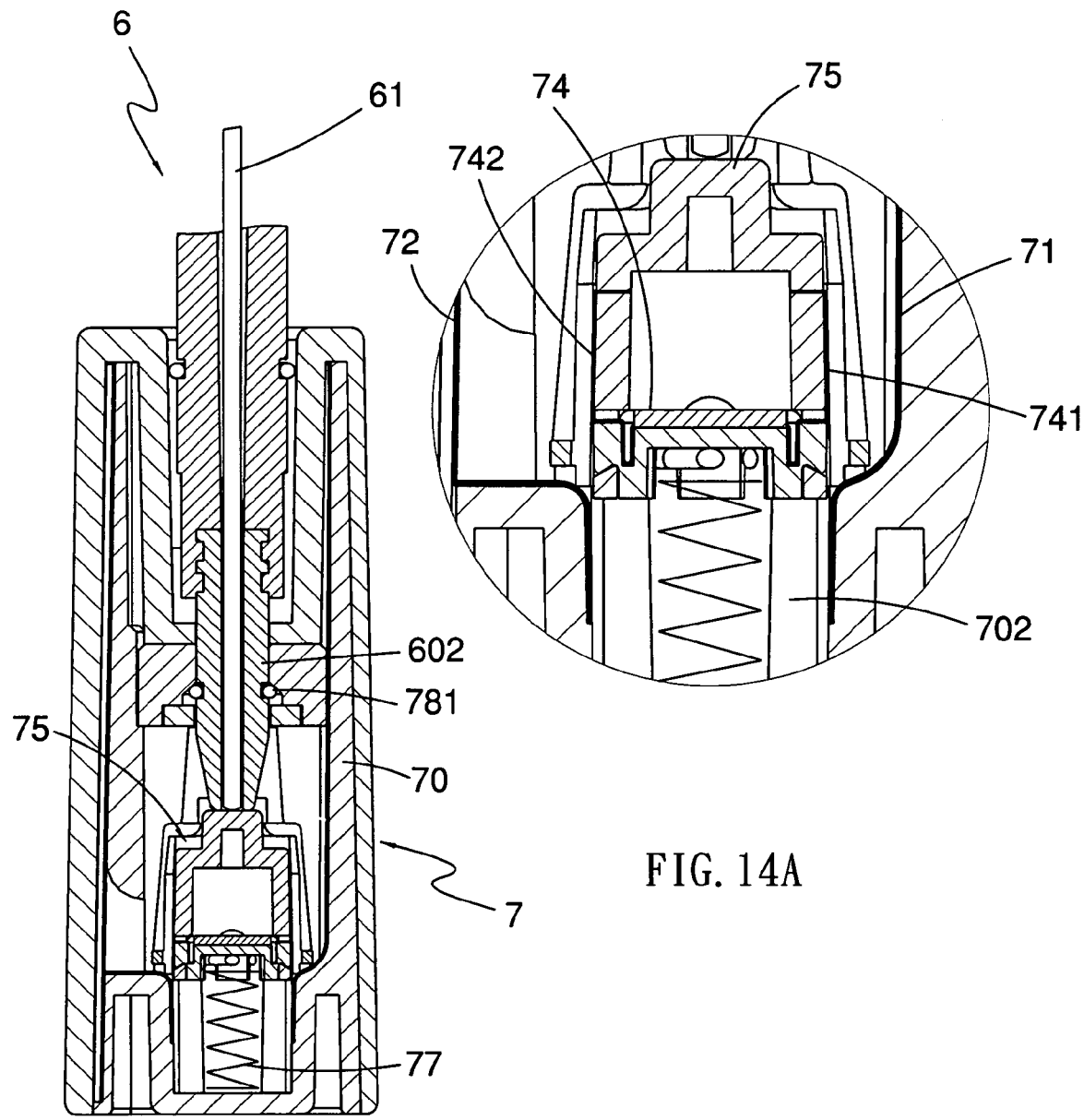
FIG. 14 is a schematic operational view of the electronic seal as shown in FIG. 12.
FIG. 14A is a locally enlarged view of the main body of the electronic seal as shown in FIG. 14.

As shown in FIG. 14, the insertion bolt 6 is cut, the bolt rod 61 is also cut. At this time, the compression spring 77 pushes the slide seat 75 to the first position by the second restoring force and then pushes the slide seat 75 to a higher position by the first restoring force. Thus, the bottom end of the bolt rod 61 is pushed by the slide seat 75 to retract into the snapping section 602.

As shown in FIG. 14A, the slide seat 75 is almost detached from the second chamber 702 of the receiving seat 70. At this time, the first conducting leg 741 and the second conducting leg 742 of the identification chip 74 are moved with the slide seat 75 to detach from the second chamber 702 of the receiving seat 70, so that the identification chip 74 is not electrically connected to the conducting plate 71 and the plate antenna 72. Thus, when the insertion bolt 6 is cut, the identification chip 74 stops operating and cannot receive the magnetic wave 5a (see FIG. 4) transmitted from the identification host 5 and cannot transmit the identification magnetic wave 3a through the bolt rod 61 and the plate antenna 72.

Figure 15:
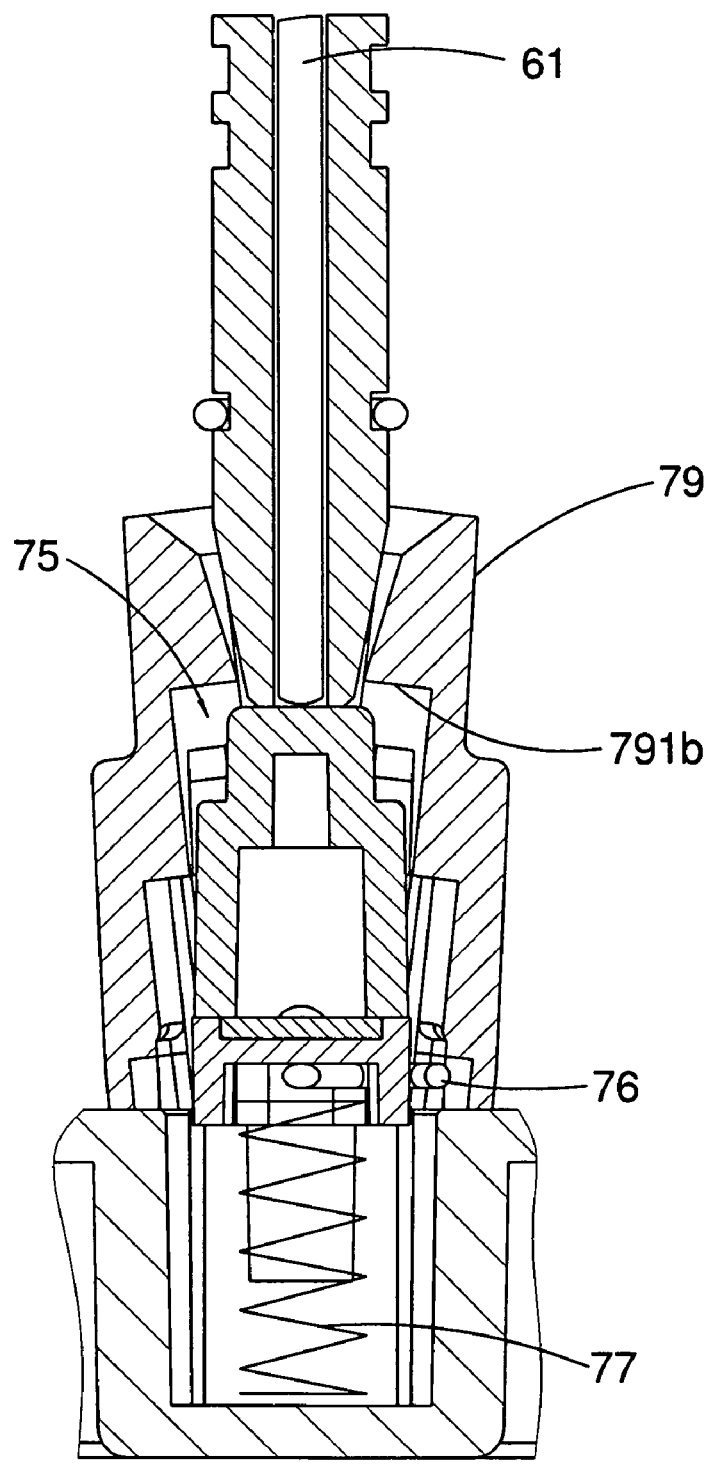
FIG. 15 is a schematic operational view of the electronic seal as shown in FIG. 13.

As shown in FIG. 15, the expansion seat 79 is expanded trough the slit 791c to expand the stop 791b, thereby detaching the slide seat 75 from the stop 791b so that the slide seat 75 can be moved to a higher position by the first restoring force of the compression spring 77. In addition, the elastic catch 76 is moved with the slide seat 75 to detach from the second chamber 702 of the receiving seat 70. After the elastic catch 76 is detached from the second chamber 702 of the receiving seat 70, the elastic catch 76 is expanded and has a maximum dimension greater than the maximum inner diameter of the second chamber 702 of the receiving seat 70.

Figure 16:
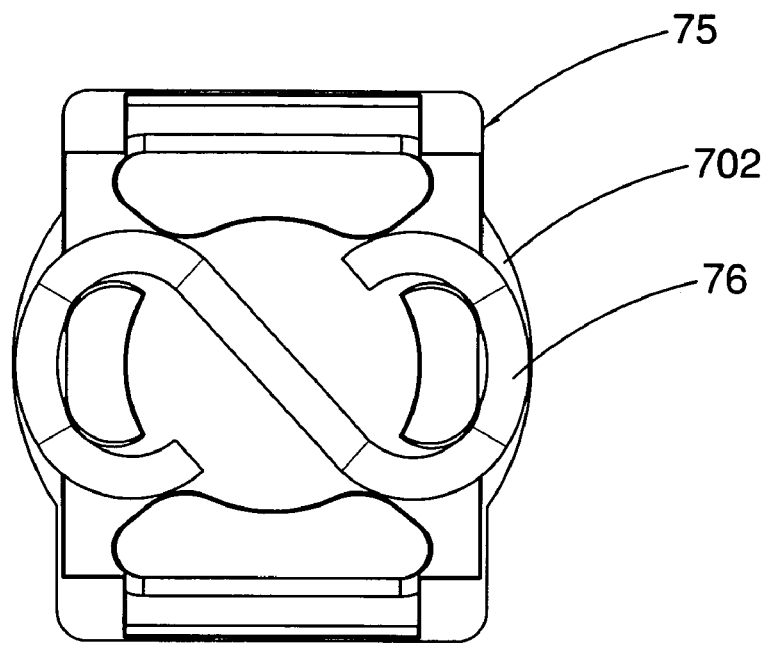
FIG. 16 is a top plan view of an elastic catch of the electronic seal as shown in FIG. 9.

As shown in FIG. 16, the elastic catch 76 is compressed to store a restoring force to allow insertion of the elastic catch 76 into the second chamber 702 of the receiving seat 70.

Figure 17:
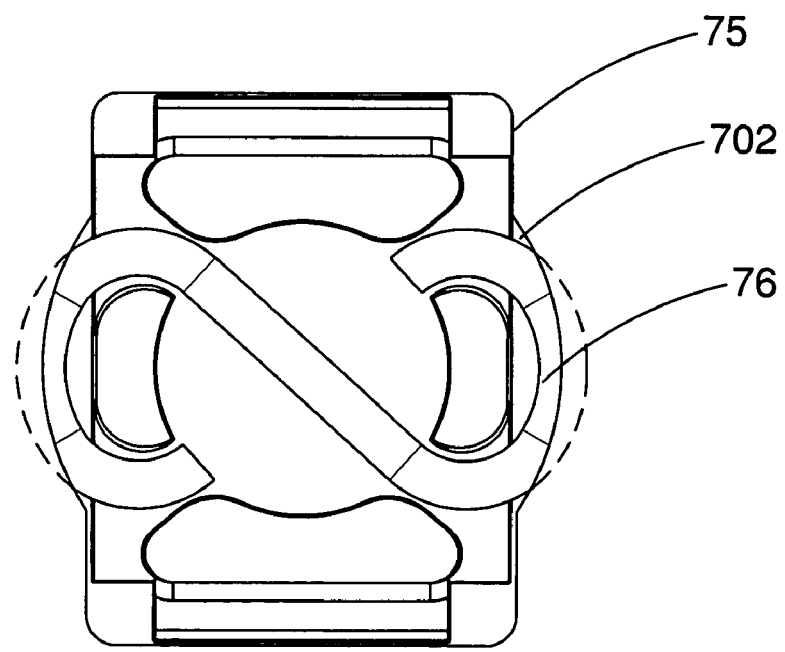
FIG. 17 is a schematic operational view of the elastic catch of the electronic seal as shown in FIG. 16.

As shown in FIG. 17, after the elastic catch 76 is detached from the second chamber 702 of the receiving seat 70, the elastic catch 76 is expanded by its restoring force and has a maximum dimension greater than the maximum inner diameter of the second chamber 702 of the receiving seat 70 so that the slide seat 75 is stopped by the elastic catch 76 and cannot be extended into the second chamber 702 of the receiving seat 70 again.

Thus, when the insertion bolt 6 is cut, the identification chip 74 stops operating. In addition, after the slide seat 75 is detached from the second chamber 702 of the receiving seat 70, the slide seat 75 cannot be extended into the second chamber 702 of the receiving seat 70 again by provision of the elastic catch 76 and the expansion seat 79, thereby preventing a person from using the cut bolt rod 61 of the insertion bolt 6 to push the slide seat 75 into the second chamber 702 of the receiving seat 70.

Figure 18:
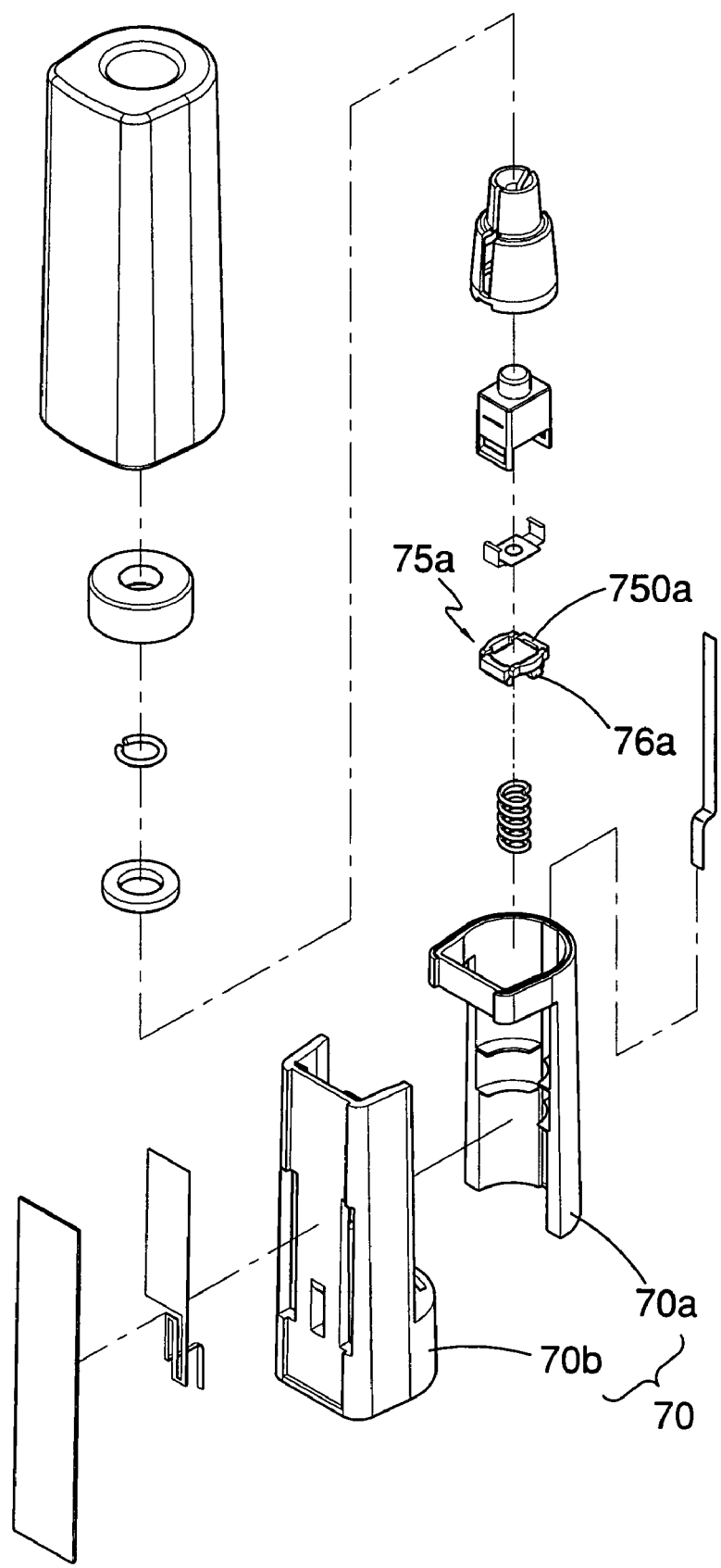
FIG. 18 is an exploded perspective view of an electronic seal in accordance with the fourth preferred embodiment of the present invention.
Figure 19:
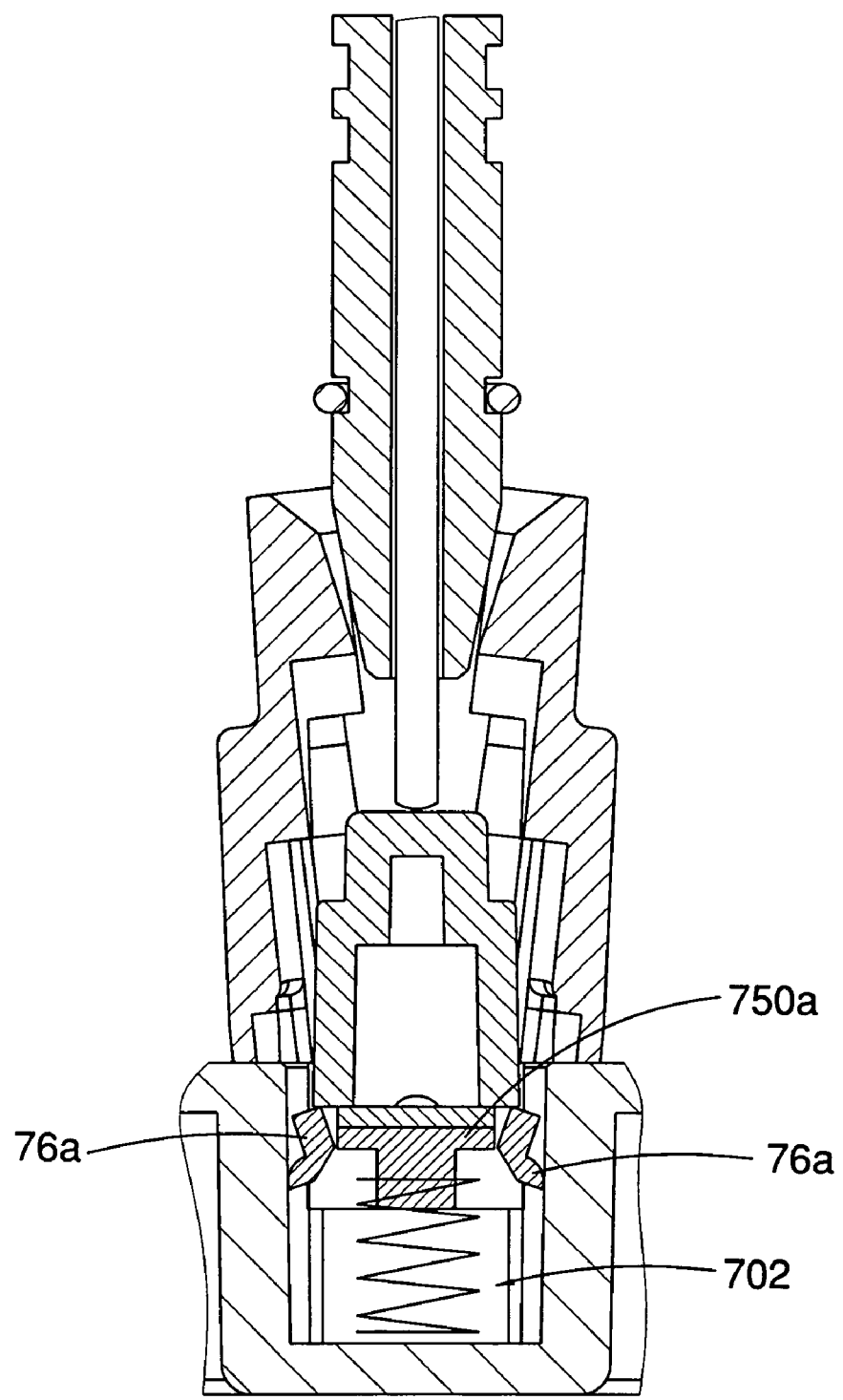
FIG. 19 is a plan cross-sectional assembly view of the electronic seal as shown in FIG. 18.
Figure 20:
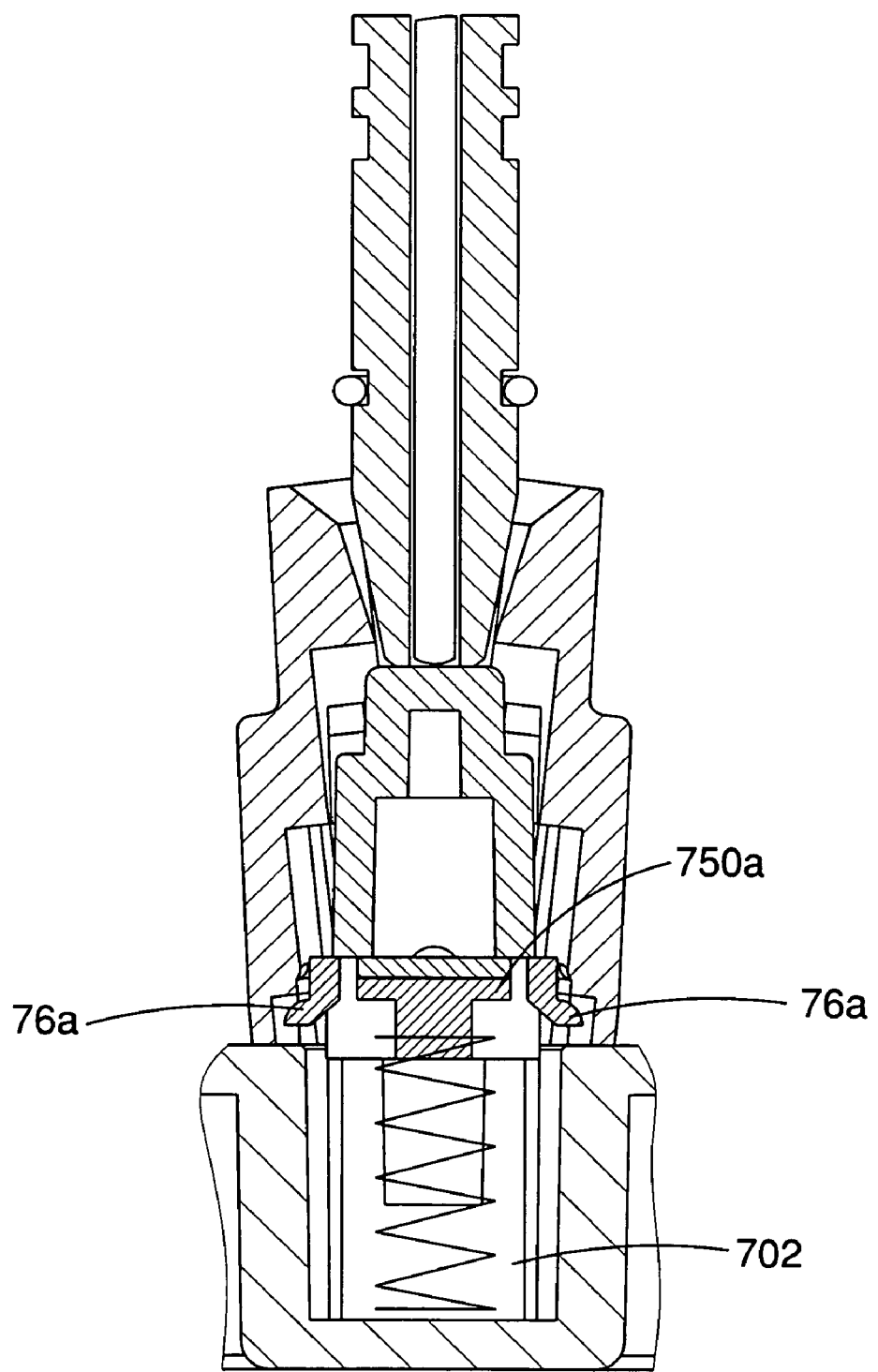
FIG. 20 is a schematic operational view of the electronic seal as shown in FIG. 19.

Referring to FIGS. 18-20, the receiving seat 70 includes a first casing 70a and a second casing 70b combined with the first casing 70a. In addition, the slide seat 75a has a base 750a provided with two opposite elastic flanges 76a to replace the elastic catch 76.

As shown in FIG. 19, when the base 750a is inserted into the second chamber 702 of the receiving seat 70, the elastic flanges 76a of the base 750a are compressed to store a restoring force to allow insertion of the elastic flanges 76a into the second chamber 702 of the receiving seat 70.

As shown in FIG. 20, after the base 750a is detached from the second chamber 702 of the receiving seat 70, the elastic flanges 76a of the base 750a are expanded by the restoring force and the maximum distance between the elastic flanges 76a is greater than the inner diameter of the second chamber 702 of the receiving seat 70 so that the base 750a is stopped by the elastic flanges 76a and cannot be extended into the second chamber 702 of the receiving seat 70 again.

Figure 21:
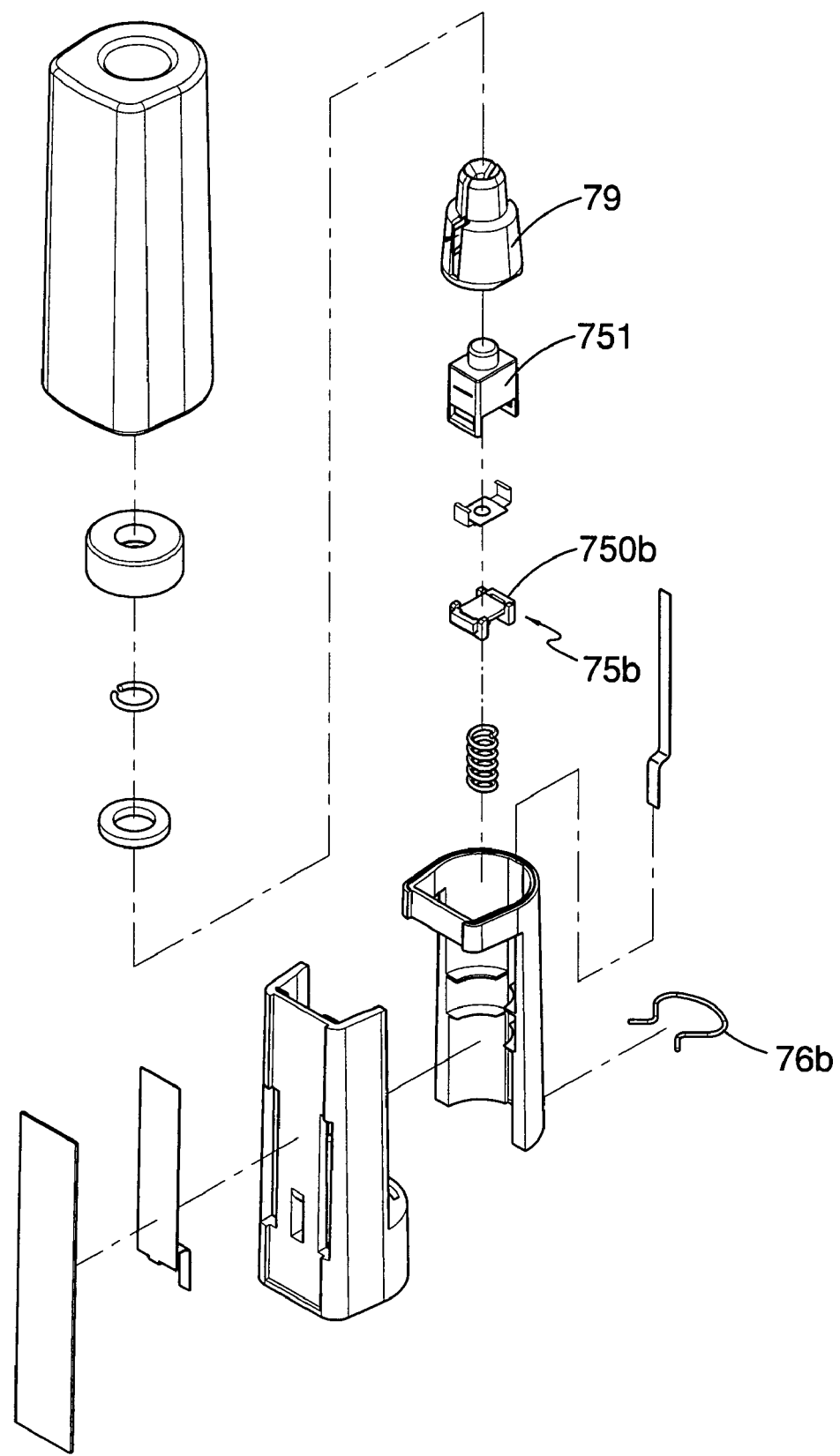
FIG. 21 is an exploded perspective view of an electronic seal in accordance with the fifth preferred embodiment of the present invention.
Figure 22:
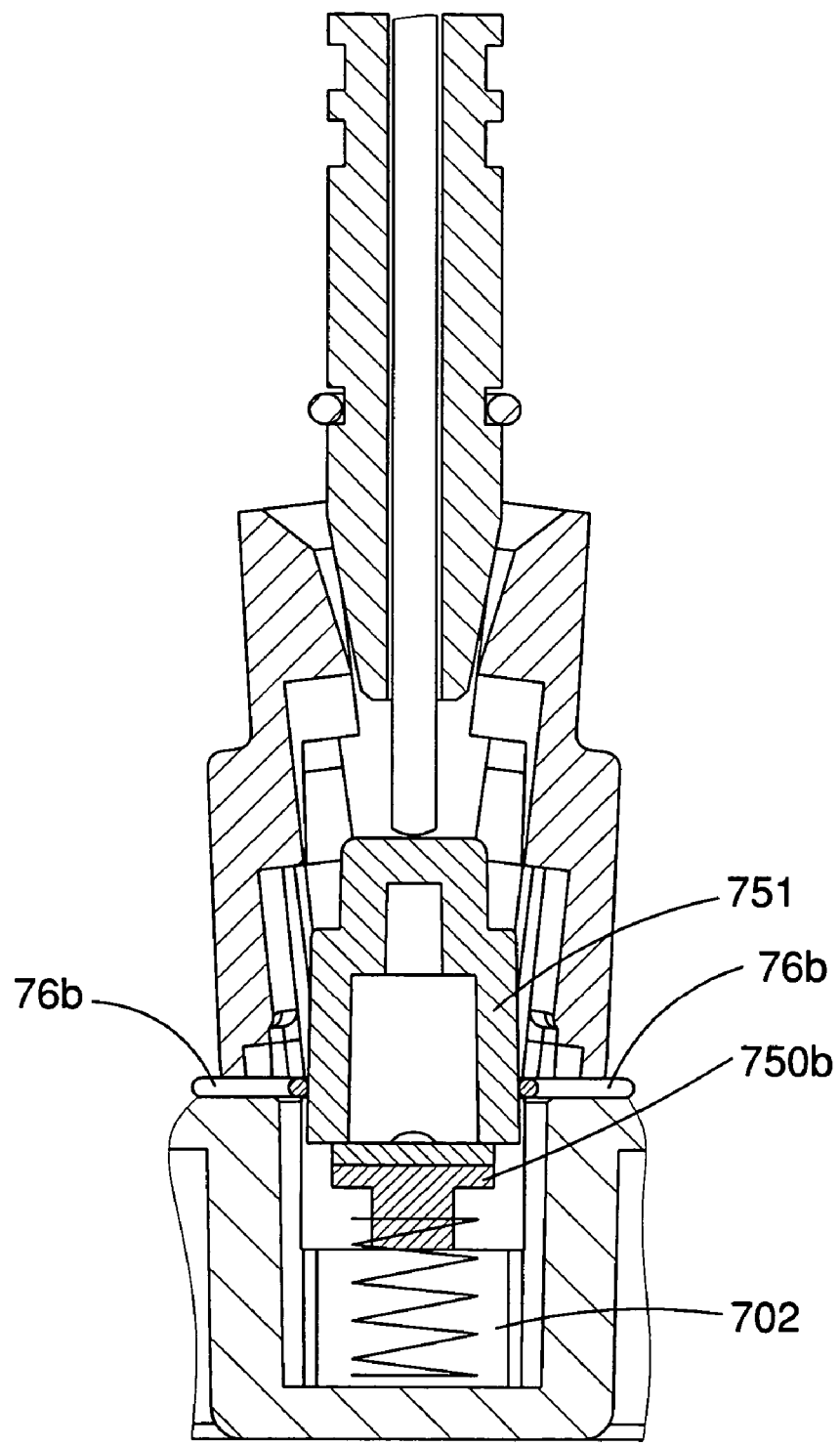
FIG. 22 is a plan cross-sectional assembly view of the electronic seal as shown in FIG. 21.
Figure 23:
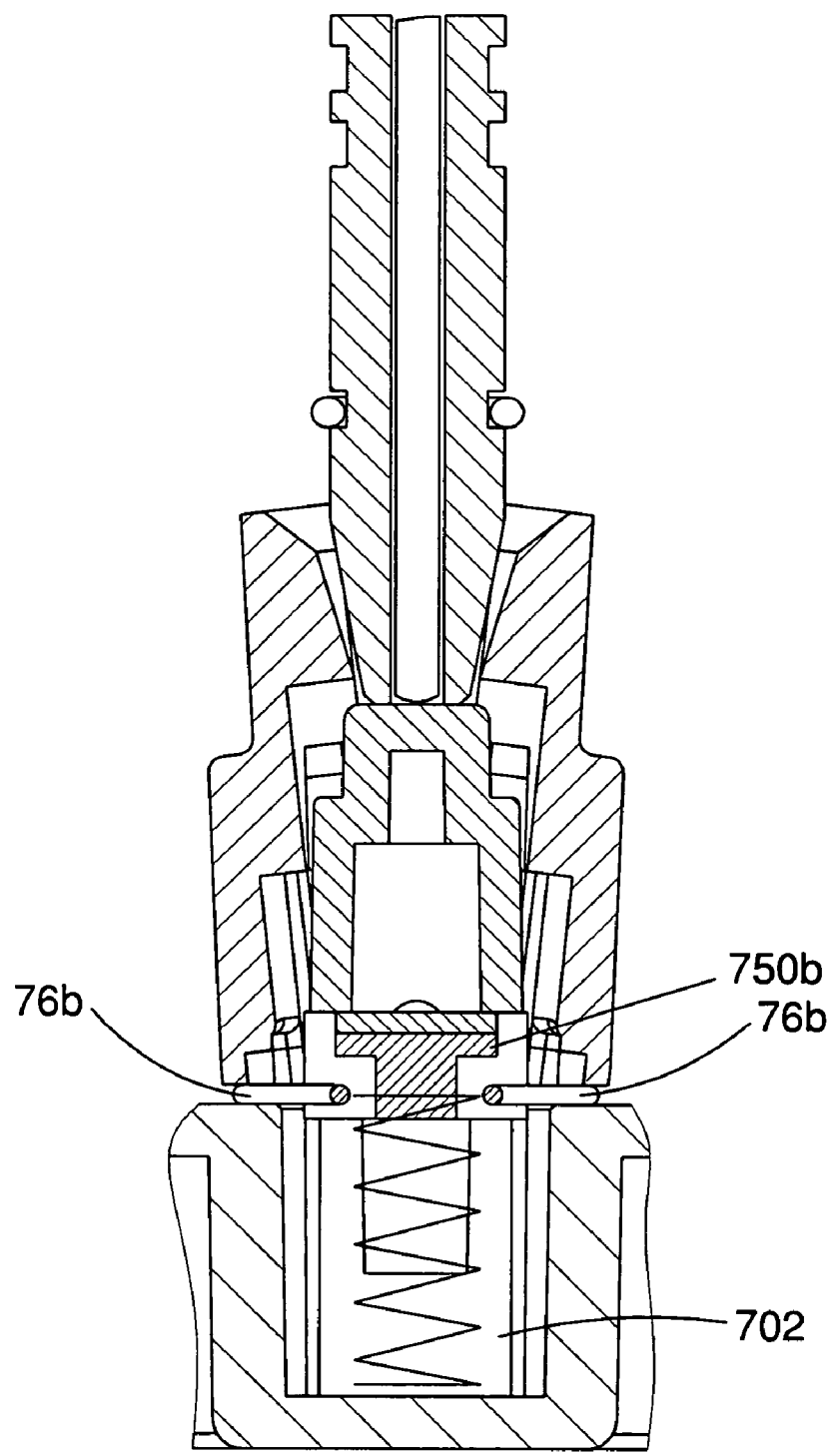
FIG. 23 is a schematic operational view of the electronic seal as shown in FIG. 22.

Referring to FIGS. 21-23, the slide seat 75b has a base 750b and the elastic catch 76 is replaced by a substantially Ω-shaped elastic catch 76b.

As shown in FIG. 22, the elastic catch 76b is pressed by the expansion seat 79 and expanded by the cover 751, so that the elastic catch 76b is not moved with the base 750b to enter the second chamber 702 of the receiving seat 70.

As shown in FIG. 23, after the base 750b is detached from the second chamber 702 of the receiving seat 70, the cover 751 is detached from the elastic catch 76b so that the elastic catch 76b is contracted by the restoring force so that the base 750b is stopped by the elastic catch 76b and cannot be extended into the second chamber 702 of the receiving seat 70 again.

It is appreciated that the identification chip is a RFID (Radio Frequency Identification) chip that adopts the modern products, such as EM4222, 4422 and 4223 produced by the EM Microelectronic company, SL3-ICS30 produced by the Philips company, XRA00 produced by ST Microelectronic company, etc.

Accordingly, the electronic seal that integrates a RFID technology and a mechanical seal so as to facilitate management of the sealed article and to inspect if the sealed article has been intruded rapidly. In addition, the electronic seal has a determined identification code so that the identification host can rapidly identify the article sealed by the electronic seal, and the sealed article is identified and managed easily and conveniently by provision of the electronic seal, thereby saving the manual work. Further, the electronic seal has a determined identification code so that the identification host can detect if the electronic seal has been broken or substituted and if the sealed article has been intruded intentionally.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An electronic seal comprising:
   a main body defining a chamber having an inlet;
   an insertion bolt provided to be inserted successively into a door latch, said inlet and then said chamber of said main body in order to fasten said door latch;
   a snapping member disposed in said chamber to fasten said insertion bolt when said insertion bolt is inserted into said chamber; and
   an RFID chip stored with an identification code and configured to allow said identification code to be read out by a host when said insertion bolt is fastened by said snapping member and disallow said identification code to be read out by said host when said insertion bolt is broken.

2. The electronic seal in accordance with claim 1, wherein said insertion bolt defines an annular groove in a peripheral wall thereof; said snapping member includes a snap ring; and when said insertion bolt is inserted into said chamber and passes through said snap ring, said snap ring is expanded and snapped into said annular groove of said insertion bolt.

3. The electronic seal in accordance with claim 2, wherein said snapping member is a C-shaped snap ring.

4. The electronic seal in accordance with claim 1, wherein said insertion bolt is conductive and said RFID chip is electrically coupled to said insertion bolt only when said insertion bolt is fastened by said snapping member; and when said RFID chip is electrically coupled to said insertion bolt, said RFID chip is ready to receive a magnetic wave transmitted from said host via said insertion bolt and then transmit an identification magnetic wave carrying said identification code back to said host via said insertion bolt and whereby said host can demodulate said identification magnetic wave to read out said identification code.

5. The electronic seal in accordance with claim 1 further comprising an antenna disposed inside said main body, wherein said RFID chip is electrically coupled to said antenna only when said insertion bolt is fastened by said snapping member; and when said RFID chip is electrically coupled to said antenna, said RFID chip is ready to receive a magnetic wave transmitted from said host via said antenna and then transmit an identification magnetic wave carrying said identification code back to said host via said antenna and whereby said host can demodulate said identification magnetic wave to read out said identification code.

6. The electronic seal in accordance with claim 5, wherein said antenna having an antenna leg extending into said chamber, and said snapping member is located under said inlet and a distal end of said antenna leg of said antenna is located under said snapping member.

7. The electronic seal in accordance with claim 5, wherein said RFID chip is located in said main body.

8. The electronic seal in accordance with claim 7, wherein said RFID chip is movably disposed in said chamber of said main body to be pushed by said insertion bolt to a specific position where said RFID chip is electrically coupled with said antenna.

9. The electronic seal in accordance with claim 8, wherein said insertion bolt defines an annular groove in a peripheral wall and a channel therein and has a bolt rod received in said channel, said bolt rod is in spaced relation to an inner wall of said channel; said snapping member includes a snap ring; and when said insertion bolt is inserted into said chamber and passes though said snap ring, said snap ring is expanded and snapped into said annular groove of said insertion bolt.

10. The electronic seal in accordance with claim 7 further comprising a slide seat movably disposed in said chamber and an antenna mounted on said slide seat, wherein said slide seat is capable of being pushed by said insertion bolt to a predetermined position where said insertion bolt is fastened by said snapping member, so as to have said RFID chip be electrically coupled to said antenna.

11. The electronic seal in accordance with claim 10 further comprising a spring disposed in said chamber, wherein said spring stores a restoring force while said slide seat is pushed to said predetermined position, and said slide seat is pushed away from said predetermined position via said restoring force when said insertion bolt is cut or broken.

12. The electronic seal in accordance with claim 1 further comprising an antenna disposed inside said main body, wherein said insertion bolt is conductive and said RFID chip is electrically coupled to both said antenna and said insertion bolt only when said insertion bolt is fastened by said snapping member; and when said RFID chip is electrically coupled to said antenna and said insertion bolt, said RFID chip is ready to receive a magnetic wave transmitted from said host via said antenna and said insertion bolt and then transmit an identification magnetic wave carrying said identification code back to said host via said antenna and said insertion bolt and whereby said host can demodulate said identification magnetic wave to read out said identification code.

13. The electronic seal in accordance with claim 1 further comprising an antenna disposed on said insertion bolt, wherein said RFID chip is electrically coupled to said antenna only when said insertion bolt is fastened by said snapping member, and when said RFID chip is electrically coupled to said antenna, said RFID chip is ready to receive a magnetic wave transmitted from said host via said antenna and then transmit an identification magnetic wave carrying said identification code back to said host via said antenna and whereby said host can demodulate said identification magnetic wave to read out said identification code.

14. A system for container management comprising:
   an electronic seal including an RFID chip stored with an identification code therein and an antenna, wherein said RFID chip is normally disconnected to said antenna and is electrically coupled to said antenna only when said electronic seal seals a door latch of a container; and said RFID chip is disconnected with said antenna when said electronic seal is broken, and an identification host capable of transmitting a magnetic wave to RFID chip of said electronic seal, receiving an identification magnetic wave carrying said identification code from said RFID chip and demodulating said identification magnetic wave to obtain said identification code;

wherein when said RFID chip is electronically coupled with said antenna, said RFID chip of said electronic seal is ready to receive said magnetic wave from said identification host and then transmit said identification magnetic wave carrying said identification code back to said identification host and whereby said host can demodulate said identification magnetic wave to read out said identification code.

* * * * *